United States Patent [19]

Motoishi et al.

[11] Patent Number: 4,608,286

[45] Date of Patent: Aug. 26, 1986

[54] GAS BARRIER MULTILAYER PACKAGING MATERIAL HAVING EXCELLENT FLEXING ENDURANCE

[75] Inventors: Yasuo Motoishi, Kurashiki; Kenji Satoh, Tondabayashi; Kyoichiro Ikari, Kurashiki, all of Japan

[73] Assignee: Kuraray Co., Ltd., Kurashiki, Japan

[21] Appl. No.: 693,126

[22] Filed: Jan. 22, 1985

[30] Foreign Application Priority Data

Jan. 31, 1984 [JP] Japan .................................. 59-17485

[51] Int. Cl.$^4$ ........................ B32B 27/30; B32B 27/32
[52] U.S. Cl. ..................................... 428/35; 428/215; 428/516; 428/520; 426/127
[58] Field of Search ................. 428/35, 332, 516, 520, 428/215

[56] References Cited

U.S. PATENT DOCUMENTS 3,932,692  1/1976  Hirata et al. ........................ 428/522
4,495,249  1/1985  Ohya et al. .......................... 428/516

*Primary Examiner*—P. C. Ives
*Attorney, Agent, or Firm*—Kramer and Brufsky

[57] ABSTRACT

A gas barrier multilayer packaging material having excellent flexing endurance, which comprises a thin layer of a saponified product of an ethylene-vinyl acetate copolymer as an intermediate layer and linear low-density polyethylene layers as inner and outer layers. This packaging material is especially useful as inner containers for a bag-in-box or bag-in-carton.

15 Claims, No Drawings

GAS BARRIER MULTILAYER PACKAGING MATERIAL HAVING EXCELLENT FLEXING ENDURANCE

BACKGROUND OF THE INVENTION

1. Field of the Invention

This invention relates to a flexible multilayer packaging material showing no reduction in gas barrier properties even under extremely severe flexing fatigue conditions. More specifically, it provides a flexible multilayer packaging material comprising a thin layer composed of a saponified product of an ethylene-vinyl acetate copolymer (hereinafter referred to as the EVOH) having gas barrier properties against oxygen, carbon dioxide etc. as an intermediate layer, said flexible multilayer packaging material being further provided with linear low-density polyethylene layers as surface layers on both sides of said multilayer ppackaging material. This material retains excellent gas barrier properties against extremely severe flexing fatigue exerted on said packaging material on transport or handling of a tight container of an easily deteriorating product packaged with said packaging material and hence being effective in prevention of deterioration in quality of the product to be packaged.

2. Description of the Prior Art

The essential function of a flexible multilayer packaging material is preservation, that is, prevention of deterioration in quality of a product to be packaged, and therefore, in said packaging material, vibration endurance, flexing endurance etc. are especially required, and in particular, where it is used as an inner container for the so-called bag in box or bag-in-carton, which is "a container of a combination of (1) a foldable plastic thin-wall inner container and (2) an outer corrugated box or carton having stackability, portability and printability", a high degree of said characteristics is required. As said packaging material, various plastic films are used by lamination by making the best use of their own characteristics. For example, a combination of a base film for maintaining mechanical strength with a heat-sealable material is most common, and the material is selected according to the requirements of the product to be packaged. In particular, in a case where the gas barrier properties against oxygen etc. of the base film are inadequate, there is employed a method of providing the base layer with a barrier layer having an even higher degree of gas barrier properties thereon and laminating a thermoplastic resin layer of a heat-sealable material with said barrier layer as an intermediate layer so as to serve as at least one outer layer. For example, since the basic material for the inner container of the conventional bag-in-box or bag-in-carton has always heat-sealable sites, the material is mainly composed of a heat-sealable polyethylene, especially a low-density polyethylene. However, an ethylene-vinyl acetate copolymer resin is more preferably employed because (1) the basic material is required to have physical strength especially, vibration endurance and flexing endurance as described above in that it must be foldable, which is a special feature of the bag-in-box or bag-in-carton, and (2) since the content is a liquid, and so forth, the basic material should be of good stress crack resistance. Further, where gas barrier properties against oxygen etc. are required because of greater demand for superior properties, said inner containers of combinations of e.g. nylon films, saran-coated nylon films, aluminum-deposited nylon films, aluminum-deposited polyester films etc. have begun to be put to practical use. In order to impart excellent gas barrier properties, saponified products of ethylene-vinyl acetate copolymer, polyvinyl chloride, aluminum foil, deposited films of metal etc. and the like are employed. However, although they are excellent in gas barrier properties, their mechanical strength is lower and cannot stand flexing fatigue. Therefore, they are used by being laminated between a base layer having excellent mechanical strength and a heat-sealable material. Even so, where, for example, used as a constituting material for an inner container of a bag-in-box or bag-in-carton, since pinholes are generated in said constituting material or, even at a stage where such pinholes have not yet been generated, the barrier properties are lowered due to cracks, pinholes etc. generated in said barrier layer used as the intermediate layer, or for other reasons, it is impossible to retain the excellent gas barrier properties against extremely severe flexing fatigue. None of these compositions has hitherto been satisfactory for practical use. The behavior of multilayer packaging materials utilizing layers mainly comprising a polyvinylidene chloride resin, an aluminum foil, a deposited resin layer with a metal etc. and the like as a barrier layer are disclosed in, for example, Japanese Patent Application Laid-open No. 7477/1980. In other words, when said packaging material is actually used for packaging and the packaged goods are transported and handled, the gas barrier properties thereof are not always satisfactory. It is due to damage in said barrier layer positioned as the intermediate layer that the desired characteristics of practical storability after the primary distribution often turns out unreliable. As the material for the intermediate layer provided for improving the gas barrier properties, an EVOH resin is most excellent and preferably used as a barrier material for containers having various multilayer films or a multilayer structure. This is because EVOH resin has the extremely advantageous feature that it not only has especially excellent gas barrier properties but also has excellent transparency, oil resistance, printability, moldability etc. and hence does not interfere with the characteristics inherent in the base material. Nevertheless, in instances where flexing endurance is particularly required, there has hitherto been no example of an EVOH resin being satisfactorily used as a barrier layer for a multilayer packaging material. In particular, as described hereinabove, it is especially required for the packaging material to withstand flexing fatigue due to vibration in transport. There has hitherto been no EVOH resin which has been used as an inner container in a bag-in-box or bag-in-carton having gas barrier properties against oxygen etc. and satisfying the above-described requirements. Therefore, the development of a flexible multilayer packaging material utilizing an EVOH layer as a barrier layer and having flexing fatigue strength which can withstand vibration in transport as well as excellent barrier properties has been one of the essential problems to be solved.

Further, Japanese Utility Model Application Laid-open No. 23353/1972 describes a multilayer packaging material comprising an EVOH as an intermediate layer and a low-density polyethylene (branched-chain low-density polyethylene) as inner and outer layers, but such a multilayer packaging material is extremely poor in flexing endurance as demonstrated in Comparative Example 1 described hereinbelow.

Furthermore, Japanese Patent Application Laid-open No. 12008/1980 (corresponding U.S. Pat. No. 4,265,949) describes a packaging material of a laminate of a linear low-density polyethylene and an EVOH, but even with the packaging material of such a constitution, the flexing endurance is still unsatisfactory as demonstrated in Comparative Example 2 described hereinbelow.

SUMMARY OF THE INVENTION

This invention provides a multilayer packaing material which comprises a thin layer of an EVOH as an intermediate layer and surface layers on both sides of said intermediate layer, said respective layers being arranged via an adhesive layer. This multilayer packaging material is a flexible gas barrier multilayer packaging material which is characterized in that both of said surface layers are composed of linear low-density polyethylene layers.

The flexing endurance may be evaluated from data on the number of flexing times resulting in reduction in gas barrier properties, the number of flexing times resulting in generation of pinholes, etc. in an evaluation test using the so-called Gelbo-Flex tester. Thereby, it is possible to judge the superiority of the flexing endurance of various materials or of multilayer packaging materials made of various materials. The present inventors have carried out extensive measurements on the relationship between the number of flexing times and the number of pinholes generated and the number of flexing times required for generation of pinholes in the case of single substance films of various thermoplastic resins and multilayer films of various resins; and also the relationship between the number of flexing times required for generation of pinholes and reduction of barrier properties (for example, oxygen permeability) in the case of multilayer laminate products, and have discovered several facts. That is, (1) the EVOH resin films are all extremely poor in flexing endurance and are far below the standard required for vibration endurance for practical use in transport; (2) the hitherto generally employed various resin films of low-density polyethylene, high-density polyethylene, nylon, polypropylene, thermoplastic polyesters etc. are remarkably excellent in flexing endurance as compared with said EVOH resin films, but the flexing endurance of a laminate film obtained by laminating said resin films using an EVOH as an intermediate layer exhibits a significant reduction in flexing endurance presumably owing to the presence of the EVOH layer; that is, there is a noticeable reduction in the excellent flexing endurance of said resin single substance film; (3) further surprisingly, the reduction in the gas barrier properties of said laminate having an EVOH layer as the intermediate layer is hardly observed until pinholes are generated; and (4) inter alia, said laminate using linear low-density polyethylene layers for both surface layers exhibits a remarkable improvement of the flexing endurance.

In a laminate having a constitution using an EVOH as an intermediate layer, the improvement of the flexing endurance is noticeable only when the linear low-density polyethylene is used as both surface layers. Further, although the details of said phenomenon have not yet been clarified, the effect of said improvement is closely related to the number of carbon atoms in an $\alpha$-olefin which is a copolymerizable component of said linear low-density polyethylene, the heat of fusion by thermal analysis by a differential scanning calorimeter and the Young's modulus. This improvement, is particularly remarkable when a linear low-density polyethylene in which these properties fall within certain parameters is used.

DETAILED DESCRIPTION OF THE PREFERRED EMBODIMENTS

The linear low-density polyethylene used in this invention is a linear low-density polyethylene substantially not having any long branched-chain. In general, the quantitative measure for the long branched-chain number $G = [\eta]_b/[\eta]_l$ (wherein $[\eta]_b$ is the intrinsic viscosity of the branched-chain polyethylene and $[\eta]_l$ is the intrinsic viscosity of the linear polyethylene having the same molecular weight as the branched-chain polyethylene) is 1 (more generally in the range of 0.9–1 and, particularly, close to 1) and the density is 0.910–0.945. (For reference, the G value of the conventional ordinary branched-chain low-density polyethylene is 0.1–0.6). The process for the production of the linear low-density polyethylene is not particularly restricted. As an example, a representative production process comprises conducting copolymerization of ethylene using an $\alpha$-olefin of 3 or more, preferably 4 or more, more preferably 5–10, carbon atoms, e.g., propylene, butene-1, 4-methyl-1-pentene, hexene-1, octene-1 etc. as a random copolymerizable component at a pressure of 7–45 kg/cm² (generally 2000–3000 kg/cm² in the case of a branched-chain low-density polyethylene) and at a temperature of 75°–100° C. (120°–250° C. in the case of a branched-chain low-density polyethylene) employing a chromium-based catalyst or a Ziegler catalyst. As the polymerization process, a liquid phase process, a gas-phase process etc. may be employed.

It has been already described hereinabove that the effect of this invention is closely related to the number of the carbon atoms in said $\alpha$-olefin, the heat of fusion by thermal analysis by a differential scanning calorimeter and the Young's modulus, and this will be described in more detail hereinbelow. While a linear low-density polyethylene is preferably used in this invention, the effect of this invention is more remarkable with said polyethylene in which said heat of fusion is not greater than 25 cal/g, preferably 25–5 cal/g, or the Young's modulus at 20° C. is not greater than 22 kg/mm², preferably 22–3 kg/mm², more preferably 22–5 kg/mm²; and particularly where both properties are in the above-mentioned regions, the effect is most remarkable. Polyethylenes in which said heat of fusion and Young's modulus are both in the above-mentioned regions are, although somewhat varying depending on the polymerization process and polymerization conditions, roughly speaking, often obtained where the content of said $\alpha$-olefin is about 2 mole % or more, preferably about 2–7 mole %. As for a linear low-density polyethylene using butene-1 as a copolymerizable component, the effect of this invention is more remarkable where said heat of fusion is not greater than 15 cal/g or the Young's modulus at 20° C. is not greater than 12 kg/mm²; and particularly where both are in the above-mentioned regions, said effect may be most noticeably observed. Said low-density polyethylene in which said heat of fusion and Young's modulus are both in the above-mentioned regions are, roughly speaking, often obtained where the butene-1 content is about 4 mole % or more. If said content is too much, the other physical characteristics possessed by said polyethylene are not satisfactory and thus it is not preferred. Therefore, the butene-1 content is desirably up to only several mole %, e.g., 7 mole %. Further, as described above, the effect of this invention may be obtained with the linear low-density polyethylene having said heat of fusion or/and Young's modulus fall in the above-mentioned specific region or regions. In particular, said effect may be more remarkably obtained with said polyethylene using an α-olefin of 5 or more carbon atoms, for example, 5-10. In this case, from the reasons similar to the above, the content of said α-olefin is preferably 2-7 mole %, more specifically 2-6 mole %. Said heat of fusion is related to said α-olefin content etc. as described above, and in particular said heat of fusion is preferably 25-5 cal/g, and the Young's modulus is preferably 22-3 kg/mm$^2$, more preferably 22-5 kg/mm$^2$. Of said olefins, a linear low-density polyethylene using as a copolymerizable component 4-methyl-1-pentene with which the effect of this invention is more remarkably exhibited and which is also industrially easily obtained is one of the more preferred. In the case of the conventional branched-chain low-density polyethylene, the effect of this invention cannot be manifested even if the heat of fusion by thermal analysis by a differential scanning calorimeter or/and the Young's modulus is/are in the above-mentioned region or regions.

In spite of extremely poor flexing endurance of the EVOH single substance film, the flexing endurance of a multilayer film using said linear low-density polyethylene as both surface layers and the EVOH layer as an intermediate layer is remarkably improved. In other words, judging from the characteristics of the EVOH film, that there is observed no reduction in the barrier properties of said multilayer packaging material at the stage where cracks or pinholes are generated in the intermediate layer and the reduction in the barrier properties of said multilayer packaging material is naturally expected. The situation is quite different from the case of the conventional multilayer packaging materials using a barrier material such as the vinylidene chloride etc.

As regards the melt viscosity of said linear low-density polyethylene, especially where said multilayer material is to be obtained by coextrusion, it is preferred from the viewpoint of melt viscosity compatibility with the EVOH resin etc. to select and use a linear low density polyethylene having relatively similar melt viscosity. The melt index (MI) as measured at 190° C. according to ASTM D-1238-65T is 0.1-20 g/10 min, preferably 0.2-10 g/10 min.

In said multilayer packaging material of this invention, if the surface layer of said linear low-density polyethylene is too thin, for example, if each layer is less than 10μ, the other physical characteristics are lowered, and thus it is preferably 10μ or more, more preferably 20μ or more. On the other hand, if the thickness is increased too much, the effect of this invention is offset, and thus each layer of said surface layers is should not exceed 60μ. In particular, for a constituting material for an inner container of a bag-in-box, it is generally preferred to employ a thickness in the region of 25-60μ (thickness of each surface layer) according to the content amount.

The multilayer packaging material of this invention is such that the respective layers are arranged via an adhesive resin layer and do not cause delamination when tested for flexing endurance by said Gelb-Flex tester. If delamination is brought about, the improved flexing endurance of the EVOH layer positioned as the intermediate layer by said lamination cannot be observed. Indeed, reduction in the barrier properties due to the damage of the EVOH layer is observed even at the stage where the generation of pinholes has not yet occurred in said multilayer film; thus the effect of this invention cannot be obtained. The adhesive resin used in this invention is not particularly restricted and may be any which does not cause delamination in use. However, an adhesive resin having good flexibility is more suitable, particularly, a modified olefinic polymer containing carboxyl groups obtained by combining chemically (e.g. by addition reaction, graft reaction etc.) an olefinic polymer with an ethylenically unsaturated carboxylic acid or its anhydride, also taking into consideration the adhesion to both linear low-density polyethylene layer and EVOH layer.

As used herein the term olefinic polymer means a polyolefin such as polyethylene (low-density, medium-density, high-density), linear low-density polyethylene, polypropylene, polybutene etc., or a copolymer of an olefin and a comonomer copolymerizable therewith (e.g. vinyl esters, unsaturated carboxylic acid esters etc.), such as ethylene-vinyl acetate copolymer, ethylene-ethyl acrylate copolymer etc. Of those, the ethylene-vinyl acetate copolymer (vinyl acetate content 5-55% by weight) and the ethylene-ethyl acrylate copolymer (ethyl acrylate concent 8-35% by weight) are preferred.

The ethylenically unsaturated carboxylic acid or its anhydride includes ethylenically unsaturated monocarboxylic acids, esters thereof, ethylenically unsaturated dicarboxylic acids, mono- or di-esters thereof, and anhydrides thereof. Of those, the anhydrides of the ethylenically unsaturated dicarboxylic acids are preferred. Specific examples include maleic acid, fumaric acid, itaconic acid, maleic anhydride, itaconic anhydride, monoethyl maleate, monoethyl maleate, diethyl maleate, methyl fumarate etc., of which the maleic anhydride is especially preferred.

The amount of the ethylenically unsaturated carboxylic acid or its anhydride to be added or grafted to the olefinic polymer is generally 0.01-15% by weight, preferably 0.02-10% by weight, based on the olefinic polymer. The addition reaction or graft reaction of the ethylenically unsaturated carboxylic acid or its anhydride to the olefinic polymer may be effected by e.g. radical polymerization in the presence of a solvent (e.g. xylene) and a catalyst (e.g. a peroxide). The MI of the thus obtained modified polyolefinic polymer containing carboxyl groups as measured at 190° C. according to ASTM D-1238-65T is 0.2-10 g/10 min., preferably 0.5-5 g/10 min. These adhesive resins may be used either singly or as a mixture of two or more thereof. A multilayer packaging material having especially excellent flexing endurance may be obtained by using as the adhesive resin, a modified olefinic polymer containing carboxylic groups or an ethylene-vinyl acrylate copolymer containing carboxyl groups. Further, the thickness of each adhesive resin layer is preferably 2-10μ.

The EVOH resin used in this invention is suitably that having an ethylene content of 20-60 mole %, preferably 25-55 mole %, and a degree of saponification of 95 mole % or more. If the ethylene content is less than 20 mole %, not only the moldability is lowered but also the effect of this invention is reduced, which presumably has something to do with the increase in rigidity of said EVOH. If the ethylene content exceeds 60 mole %, although the rigidity is reduced, the most important feature of said resin, i.e., the gas barrier properties against oxygen etc., is reduced and thus this is not satisfactory. Said EVOH resin may be a blend of two or more different resins having an ethylene content in the range of 20–60 mole % as long as they exhibit compatibility, and thus the effect of this invention may be imparted. The degree of saponification of said resin is preferably 95 mole % or more, and if it is less than 95 mole %, said barrier properties are deteriorated and thus this is not preferred. Further, an EVOH treated with a boron compound such as boric acid etc., a modified EVOH obtained by copolymerizing ethylene and vinyl acetate with a third component such as a silicon-containing olefinically unsaturated monomer etc. and saponifying, etc. may be used as long as the degree of modification is within the range that melt molding is possible and the barrier properties are not interfered with, thereby the effect of this invention may be imparted. The melt index of this EVOH as measured at 190° C. according to ASTM D-1238-65T is 0.1–25 g/10 min., preferably 0.3–20 g/10 min.

As has been described above, in the case of the EVOH single layer, the flexing endurance is extremely poor. There is somewhat improving tendency with a decrease in thickness, but this is nothing but a phenomenon far below the degree of flexing endurance satisfactorily fulfilling the vibration endurance in transport required in practice. On the contrary, in the constitution of this multilayer packaging material of this invention, there is observed a specific relationship between the layer thickness of the EVOH present as the intermediate layer and the number of flexing times on a Gelbo-Flex tester required for generation of pinholes due to flexing fatigue. If the thickness of said EVOH layer exceeds 20μ, the flexing endurance is deteriorated and the effect of this invention is reduced, and thus it is not preferred. In order to sufficiently obtain the effect of this invention, the thickness of the EVOH layer is preferably does not exceed 20μ, more preferably does not exceed 15μ. From a viewpoint of the flexing endurance alone, a thickness not exceeding 10μ is most preferred. Although the EVOH layer should be preferably as thin as possible from a viewpoint of flexing endurance, difficulty from an aspect of molding technique is accordingly increased. For practical reasons, it is preferably 2μ or more, and from said aspect, 5μ or more is more preferred because molding difficulty is relatively small. In this invention, the intermediate EVOH layer may also be composed of multiple sub-layers of two or more sub-layers. On providing multiple EVOH sub-layers, an optimum constitution may be chosen according to the desired purposes. For example, the EVOH having the same ethylene content may be used in all the sub-layers. Where the relative humidity of the inside of the container etc. is greater than the outside of said container, e.g., the product to be packaged is an aqueous mixture such as wine, it is preferred to arrange in EVOH sub-layers having a smaller ethylene content outside and an EVOH sub-layer having a larger ethylene content inside also considering the humidity dependency of the barrier properties of the EVOH. On the other hand, where the relationship of the relative humidity is opposite to the above, the positional relationship of said EVOH sub-layers is preferably in the opposite order.

The multilayer packaging material of this invention may be obtained by a conventional process such as coextrusion, extrusion lamination, dry lamination etc., of which coextrusion is preferred. Further, where film formation is effected by the coextrusion, the use of air slit at the time of film forming is effective. As used therein, the air slit means an operation to blow air in a slit form on a melt resin film discharged from a die onto a cast roll in order to closely contact it to the cast roll so as to enhance the cooling effect.

Further, an inner container of a bag-in-box or bag-in-carton using said multilayer packaging material may be obtained by a conventional process, such as a process comprising heat sealing a film of said laminate constitution and fitting a mouthpiece, a process comprising making a container of said laminate constitution by e.g. vacuum molding, and fixing a mouthpiece with an adhesive etc., a blow molding process comprising melt extruding a multilayer parison of said laminate constitution, sandwiching it with a mold having a mouthpiece inserted therein, and molding it using compressed air, thereby heat bonding the body and the mouthpiece by the heat of the parison and the air pressure at that time, etc.

In addition, in this invention, as long as the purposes of this invention are not interfered, the multilayer material comprising the EVOH as the intermediate layer and the linear low-density polyethylene layers on its both sides may be further provided with another layer.

The multilayer packaging materials of this invention thus obtained are particularly preferred as container materials for transporting food, particularly liquid goods, including alcohols such as wine, sake etc., soy sauce, and the like. In other words, where bags (each provided with a mouthpiece for filling and discharging the liquid to be filled) using said multilayer packaging material, the above-mentioned liquid food is filled therein, these bags are sealed, packed in a box or carton to present the so-called bag-in-box or bag-in-carton and this is transported. Since the multilayer packaging material used as the material for the bags (inner containers) is excellent in flexing endurance, no cracks are generated and thus the leakage of the liquid food can be prevented and also the deterioration of the quality of the liquid food due to the invasion of oxygen may be prevented.

EXAMPLE 1

Using 3 extruders and a 3-materials 5-layers multilayer diehead and also employing air slit, there was obtained by coextrusion a multilayer film which comprised an intermediate layer of 12μ in thickness and of an EVOH resin having an ethylene content of 31 mole %, a degree of saponification of 99.4 mole % and an MI of 1.3 g/10 min., and surface layers on its both sides, each of said surface layers being of a linear low-density polyethylene (hereinafter referred to as LLDPE) having an MI as measured under conditions of 190° C. and a load of 2,160 g according to ASTM D-1238-65T of 2.1 g/10 min. and a heat of fusion by differential scanning calorimeter of 19 cal/g. The respective layers were arranged via an adhesive resin layer composed of a modifed ethylene-vinyl acetate copolymer having a vinyl acetate content of 33% by weight, a degree of modification with maleic anhydride of 1.5% by weight and an MI of 1.5 g/10 min. A flexing fatigue test (Gelbo-Flex test) was conducted on the obtained multilayer film until the generation of pinholes was observed on said multilayer film. Also the oxygen transmission rate was measured at various stages until the generation of said pinholes.

The Gelbo-Flex test is carried out by using a Gelbo-Flex tester (manufactured by Rigaku Kogyo Co., Ltd.), making a specimen of 12"×8" into a cylindrical form of 3.5" in diameter, holding both ends, then, with an initial holding distance of 7" and a holding distance at the most folded time of 1", applying a twist at an angle of 440° for the first 3.5" of the stroke and effecting linear horizontal movement for the subsequent 2.5" and repeating such reciprocating motion at a rate of 40 times per minute under conditions of 20° C. and a relative humidity of 65%.

The measurement of the amount of oxygen gas permeated was conducted using an OXY-TRAN 100 manufactured by Modern Control Co. at 20° C.–65% relative humidity (hereinafter referred to as RH) and 20° C.–80% RH. The sample after the Gelbo-Flex test at various stages was flattened to the original 12"×8", and measurement was made on its central part. The Young's modulus was measured according to ASTM D-882/67 at 20° C.–65% RH. The results of the measurements are shown in Table 1. In the course of the Gelbo-Flex test until the generation of pinholes, there was hardly observed a change in the oxygen transmission rate. Further, the generation of pinholes was not observed even after 4,000 returns in said Gelbo-Flex test, and after 4,050 returns, when examined for the presence of pinholes, it was found that one pinhole had already been generated. Further, no delamination was observed between any adjacent layers. Separately, another LLDPE film was obtained in the same manner and measured for the Young's modulus at 20° C. to obtain 13 kg/mm².

TABLE 1

| Number of times of flexing in Gelbo-Flex Test | 0 | 1000 | 2500 | 4000 |
|---|---|---|---|---|
| Oxygen 20° C. 65% RH | 0.7 | 0.7 | 0.7 | 0.7 |
| transmission rate 20° C. 80% RH (cc/m 2.24 hrs. atm) | 1.5 | 1.5 | 1.4 | 1.5 |

EXAMPLE 2

Procedures similar to those in Example 1 were conducted except that an EVOH resin having an ethylene content of 45 mole % and a degree of saponification of 99.2 mole % was used as an intermediate layer and the thickness of the surface layers (LLDPE) provided on both sides of said intermediate layer were 40μ and 30μ respectively.

The generation of pinholes was not observed until after 4500 number of times of flexing in said Gelbo-Flex test, and after 4600 times of flexing, it was observed that two pinholes had already been generated. The measured values of the oxygen transmission rate are shown in Table 2. No delamination was observed between any adjacent layers.

TABLE 2

| | | Number of times of flexing in Gelbo-Flex Test | | | |
|---|---|---|---|---|---|
| | | 0 | 1000 | 2500 | 4500 |
| Oxygen | 20° C. 65% RH | 2.0 | 2.0 | 1.9 | 2.0 |
| transmission rate (cc/m 2 · 24 hrs · atm) | 20° C. 80% RH | 3.7 | 3.6 | 3.6 | 3.7 |

EXAMPLE 3

Using a 3-materials 7-layers multilayer diehead, a multilayer film having a constitution of D/Ad/E/Ad/-F/Ad/G. Each layer comprised the resin and thickness described below.

Ad: An adhesive resin layer of 5μ in thickness and composed of a modified ethylene-vinyl acetate copolymer having a vinyl acetate content of 35% by weight, a degree of modification with maleic anhydride of 1.0% by weight and an MI of 1.8 g/10 min.

D, G: An LLDPE layer of 38μ in thickness, containing 4.1 mole % of 4-methyl-1-pentene as a copolymerizable component, and having a MI of 2.3 g/10 min. and a heat of fusion by differential scanning calorimeter of 15 cal/g.

E, F: An EVOH resin layer of 6μ in thickness and having an ethylene content of 38 mole %, a degree of saponification of 99.4 mole % and an MI of 1.6 g/min. A Gelbo-Flex test was conducted in a manner similar to that in Example 1. No pinhole generation was observed even after 5000 times of flexing in said Gelbo-Flex test. The measured values of the oxygen transmission rate at various stages until said 5000 times of flexing are shown in Table 3. No delamination was observed between any adjacent layers. Separately, another LLDPE film of the same constitution was obtained and measured for the Young's modulus at 20 C to obtain 7.5 kg/mm².

TABLE 3

| | | Number of times of flexing in Gelbo-Flex Test | | | |
|---|---|---|---|---|---|
| | | 0 | 1000 | 2500 | 5000 |
| Oxygen | 20° C. 65% RH | 1.3 | 1.3 | 1.2 | 1.3 |
| transmission rate (cc/m 2 · 24 hrs · atm) | 20° C. 80% RH | 1.7 | 1.6 | 1.6 | 1.7 |

EXAMPLE 4

Procedures similar to those in Example 3 were conducted except that E was a layer of 8μ in thickness and composed of the same EVOH resin as in Example 1 and F was a layer of 6μ in thickness and composed of the same EVOH resin as in Example 2. Even after 5000 times of flexing in said Gelbo-Flex test, no pinhole generation was observed. The measured values of the oxygen transmission rate at various stages until said 5000 times of flexing are shown in Table 4. No delamination was observed between any adjacent layers.

| | | Number of times of flexing in Gelbo-Flex Test | | | |
|---|---|---|---|---|---|
| | | 0 | 1000 | 2500 | 5000 |
| Oxygen | 20° C. 65% RH | 0.8 | 0.7 | 0.8 | 0.8 |
| transmission rate (cc/m 2 · 24 hrs · atm) | 20° C. 80% RH | 1.7 | 1.7 | 1.8 | 1.8 |

EXAMPLE 5

Procedures similar to those in Example 1 were conducted except that in Example 1 the thickness of the EVOH was changed to 19μ and, as the adhesive resin, there was used a modified ethylene-ethyl acrylate copolymer having an ethyl acrylate content of 25% by weight, a degree of modification with maleic anhydride of 1.7% by weight and an MI of 1.8 g/10 min., each adhesive layer being 7μ in thickness. Until after 3600 times of flexing in said Gelbo-Flex test, no pinhole generation was observed. After 4000 times of flexing, it was found that 3 pinholes had been generated. The oxygen transmission rate at various stages in said Gelbo-Flex test until 4000 times of flexing are shown in Table 5. No delamination was observed between any adjacent layers.

TABLE 5

|  |  | Number of times of flexing in Gelbo-Flex Test | | |
|---|---|---|---|---|
|  |  | 0 | 2500 | 3600 |
| Oxygen transmission rate (cc/m 2 · 24 hrs · atm) | 20° C. 65% RH | 0.4 | 0.4 | 0.4 |
|  | 20° C. 80% RH | 0.9 | 0.8 | 0.9 |

EXAMPLE 6

Procedures similar to those in Example 1 were conducted except that as both surface layers, there was used an LLDPE containing 1-heptene as a copolymerizable component and having said content of 2.9 mole %, a heat of fusion by differential scanning calorimeter of 21 cal/g and Young's modulus measured at 20° C. of 15 kg/mm$^2$. Even after 3500 times of flexing in said Gelbo-Flex test, no pinhole generation was observed, and there was hardly any change in the oxygen transmission rate, which was more or less 1.4 cc/m$^2$.24 hrs.atm (20° C., 80% RH).

EXAMPLE 7

Procedures similar to those in Example 1 were conducted except that both surface layers were composed of an LLDPE containing butene-1 as a copolymerizable component and having said content of 5.1 mole %, a heat of fusion by differential scanning calorimetry of 12 cal/g and Young's modulus of 8 kg/mm$^2$. Even after 4000 times of flexing in said Gelbo-Flex test, no pinhole generation was observed, and there was hardly any change in the oxygen transmission rate, which was 1.5 ccm/m$^2$.24 hrs.atm (20° C., 80% RH)

EXAMPLE 8

Procedures similar to those in Example 7 were conducted except that an LLDPE having a butene-1 content of 3.6 mole %, a heat of fusion by differential scanning calorimetry of 19 cal/g and Young's modulus of 16 kg/mm$^2$ was used. Even after 850 times of flexing in said Gelbo-Flex test, no pinhole generation was observed, but after 900 times of flexing therein, such generation was recognized. The oxygen transmission rate was hardly changed at various stages until the generation of pinholes.

COMPARATIVE EXAMPLE 1

Procedures similar to those in Example 1 were conducted except that both surface layers were constructed using conventional various low-density polyethylenes. In said Gelbo-Flex test, the number of times of flexing until the generation of pinholes was 200 at highest with any product.

COMPARATIVE EXAMPLE 2

Using a coextruding equipment having a 3-materials 3 layers multilayer diehead, a multilayer film having a constitution of F (15μ)/Ad (7μ)/G (40μ) was obtained from the same materials as Example 3.

As the result of a Gelbo-Flex test conducted according to Example 1, the number of times of flexing until the generation of pinholes was 250 at highest.

EXAMPLE 9

Multilayer packaging materials obtained in Example 1-8 and Comparative Examples 1 and 2 respectively were heat-sealed and fitted with mouthpieces to obtain packaging bags. One kg of liquid food was filled into each bag and the mouthpiece was sealed. Twenty of such sealed bags were packed in each corrugated box to prepare a bag-in-box. The bag-in-box was conditioned at 20° C. and 65% RH for 2 days, and subjected to a vibration test by a rotary type vibration tester (vibrating conditions 267 rpm). The results are shown below.

TABLE 6

| Multilayer Packaging Material | Breakage percentage | |
|---|---|---|
|  | Vibration 15 min. | Vibration 30 min. |
| Examples 1-8 | 0 | 5-10 |
| Comparative Example 1 | 20 | 80 |
| Comparative Example 2 | 15 | 65 |

Note
The vibration time of 10 min. is equivalent to 1000 km by truck transport.

What is claimed is:

1. A gas barrier multilayer food packaging material having excellent flexing endurance suitable for use as an inner container in a bag-in-box or bag-in-carton assembly, which comprises an intermediate layer of a saponified product of an ethylene-vinyl acetate copolymer having a thickness of from 5-20μ, and surface layers of linear low-density polyethylene on both sides of said intermediate layer, each of said surface layers having a thickness of from 25-60μ, the layers being adhered to each other by an adhesive resin.

2. The multilayer packaging material according to claim 1 wherein the linear low-density polyethylene uses an α-olefin of 4 or more carbon atoms as a copolymerizable component.

3. The multilayer packaging material according to claim 1 wherein the heat of fusion of the linear low-density polyethylene as measured by thermal analysis by a differential scanning calorimeter is 25 cal/g or less.

4. The multilayer packaging material according to claim 3 wherein the linear low-density polyethylene uses butene-1 as a copolymerizable component and has a heat of fusion by thermal analysis by a differential scanning calorimeter of 15 cal/g or less.

5. The multilayer packaging material according to claim 1 wherein the Young's modulus at 20° C. of the linear low-density polyethylene is 22 kg/mm$^2$ or less.

6. The multilayer packaging material according to claim 5 wherein the linear low-density polyethylene uses butene-1 as a copolymerizable component and has Young's modulus at 20° C. of 12 kg/mm$^2$ or less.

7. The multilayer packaging material according to claim 1 wherein the linear low-density polyethylene uses an α-olefin of 5 or more carbon atoms as a copolymerizable component.

8. The multilayer packaging material according to claim 7 wherein the linear low-density polyethylene uses 4-methyl-1-pentene as a copolymerizable component.

9. The multilayer packaging material according to claim 1 wherein the adhesive resin is a modified olefinic polymer containing carboxyl groups obtained by chemically combining an ethylenically unsaturated carboxylic acid or its anhydride with the olefinic polymer.

10. The multilayer packaging material according to claim 9 wherein the modified olefinic polymer containing carboxyl groups is that obtained by chemically combining 0.01–15% by weight of an ethylenically unsaturated carboxylic acid or its anhydride with the olefinic polymer.

11. The multilayer packaging material according to claim 9 wherein the olefinic polymer is an ethylene-vinyl acetate copolymer.

12. The multilayer packaging material according to claim 11 wherein the olefinic polymer is an ethylene-vinyl acetate copolymer containing 5–55% by weight of the vinyl acetate.

13. The multilayer packaging material according to claim 9 wherein the olefinic polymer is an ethylene-ethyl acrylate copolymer.

14. The multilayer packaging material according to claim 13 wherein the olefinic polymer is an ethylene-ethyl acrylate copolymer containing 8–35% by weight of the ethyl acrylate.

15. The multilayer packaging material according to claim 8 wherein the saponified product of an ethylene-vinyl acetate copolymer has an ethylene content of 20–60 mole % and a degree of saponification of 95 mole or more.

* * * * *

UNITED STATES PATENT AND TRADEMARK OFFICE
CERTIFICATE OF CORRECTION

PATENT NO. : 4,608,286

DATED : August 26, 1986

INVENTOR(S) : Yasuo Motoishi et al

It is certified that error appears in the above-identified patent and that said Letters Patent is hereby corrected as shown below:

In Claim 15, line 4 thereof, after "95" mole",
    insert --%--.

Signed and Sealed this

Sixteenth Day of December, 1986

Attest:

DONALD J. QUIGG

Attesting Officer          Commissioner of Patents and Trademarks